US010532758B2

(12) United States Patent
Barenbrug et al.

(10) Patent No.: US 10,532,758 B2
(45) Date of Patent: Jan. 14, 2020

(54) REMOVABLE HAND GRIP FOR WRAPPING AROUND A BAR

(71) Applicant: ROYALTY BUGABOO GMBH, Zug (CH)

(72) Inventors: Machiel Gerardus Theodorus Marie Barenbrug, Zug (CH); Ruben Arnt Kempes, Zug (CH); Marco Willem Hendricus Nieuwenhuizen, Zug (CH); Pieter Anthonie Hollebrandse, Zug (CH); Andreas Johannes Petrus Schalkwijk, Zug (CH)

(73) Assignee: ROYALTY BUGABOO GMBH, Zug (CH)

( * ) Notice: Subject to any disclaimer, the term of this patent is extended or adjusted under 35 U.S.C. 154(b) by 0 days.

(21) Appl. No.: 15/763,276

(22) PCT Filed: Sep. 12, 2016

(86) PCT No.: PCT/EP2016/071451
§ 371 (c)(1),
(2) Date: Mar. 26, 2018

(87) PCT Pub. No.: WO2017/050601
PCT Pub. Date: Mar. 30, 2017

(65) Prior Publication Data
US 2018/0354541 A1 Dec. 13, 2018

(30) Foreign Application Priority Data
Sep. 24, 2015 (NL) ........................................ 2015498

(51) Int. Cl.
B62B 5/06 (2006.01)
B62B 9/20 (2006.01)

(52) U.S. Cl.
CPC ................ B62B 5/069 (2013.01); B62B 9/20 (2013.01)

(58) Field of Classification Search
CPC . G05G 1/06; G05G 1/10; B62K 21/26; B62K 21/12; B62K 11/14; B62B 5/069;
(Continued)

(56) References Cited

U.S. PATENT DOCUMENTS 2,274,605 A 2/1942 Hoffmeister
5,511,445 A 4/1996 Hildebrandt
(Continued)

FOREIGN PATENT DOCUMENTS

CA 2428867 A1 11/2004
DE 1554454 A1 1/1970
(Continued)

OTHER PUBLICATIONS

International Search Report and Written Opinion for PCT Patent App. No. PCT/EP2016/071451 (dated Nov. 22, 2016).

Primary Examiner — Richard W Ridley
Assistant Examiner — Brian J McGovern
(74) Attorney, Agent, or Firm — Kenealy Vaidya LLP

(57) ABSTRACT

Some embodiments are directed to a hand grip for wrapping around a handlebar. The hand grip includes a first elongated coupling member, a second elongated coupling member, and a cover arranged between the first elongated coupling member and the second elongated coupling member. The first and/or second elongated coupling member include one or more protrusions arranged to be inserted into one or more holes or recesses of the bar. The hand grip can easily be attached to for example a handlebar of a baby stroller, and can easily be removed.

8 Claims, 15 Drawing Sheets

(58) Field of Classification Search
CPC ....... B62B 5/06; B62B 9/20; Y10T 74/20876; Y10T 74/2087; B62D 1/06
See application file for complete search history.

(56) References Cited

U.S. PATENT DOCUMENTS

| | | | |
|---|---|---|---|
| 6,196,562 B1 * | 3/2001 | Zhuang | B62B 9/20 16/110.1 |
| 6,263,759 B1 | 7/2001 | Hollingsworth et al. | |
| 6,499,377 B1 * | 12/2002 | Schuler | B62D 1/06 74/558 |
| 8,800,112 B1 | 8/2014 | Douglas | |
| 2006/0248683 A1 | 11/2006 | Ohishi et al. | |
| 2009/0247827 A1 | 10/2009 | Secrest et al. | |
| 2011/0049844 A1 * | 3/2011 | Cheng | B62B 9/20 280/658 |
| 2014/0328077 A1 * | 11/2014 | Tovar | B62D 1/046 362/511 |

FOREIGN PATENT DOCUMENTS

| | | |
|---|---|---|
| DE | 9317500 U1 | 12/1993 |
| EP | 2368671 A1 | 9/2011 |
| GB | 2323777 A | 10/1998 |
| GB | 2501543 A | 10/2013 |
| GB | 2505648 A | 3/2014 |
| GB | 2506189 A | 3/2014 |
| JP | 2010-110615 A | 5/2010 |

* cited by examiner

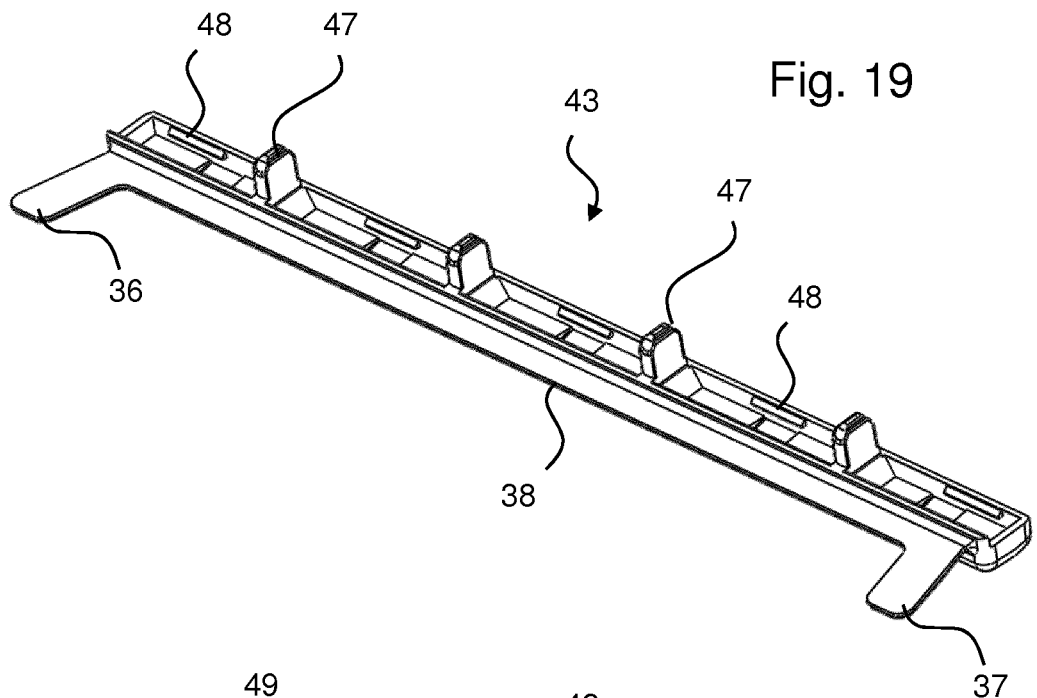
Fig. 19
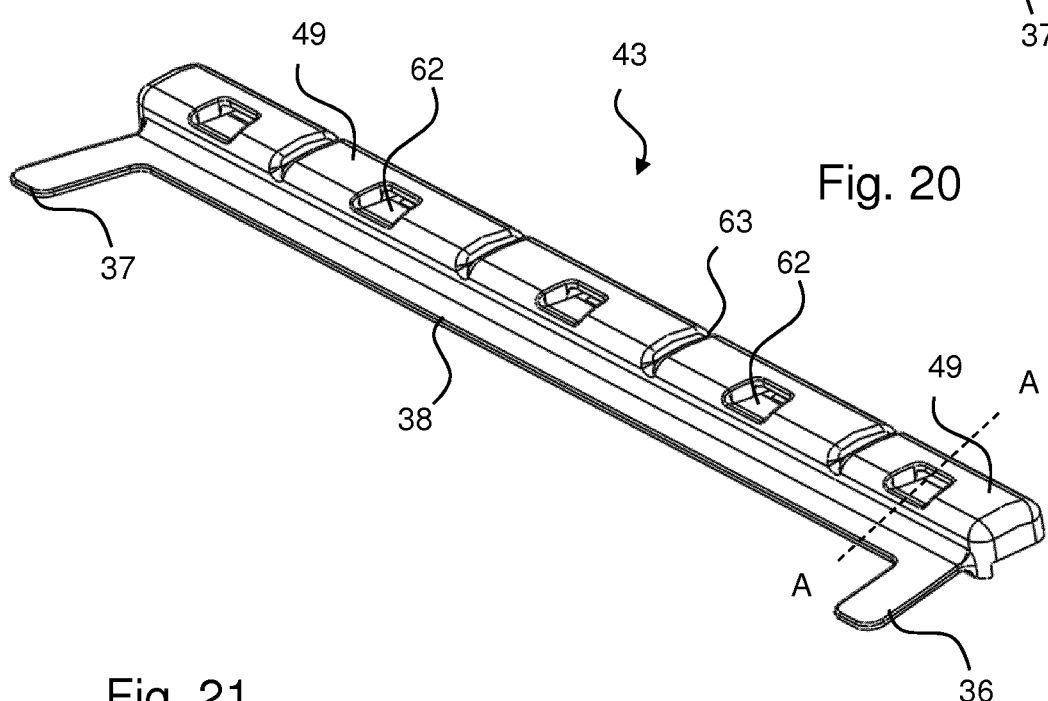
Fig. 20
Fig. 21
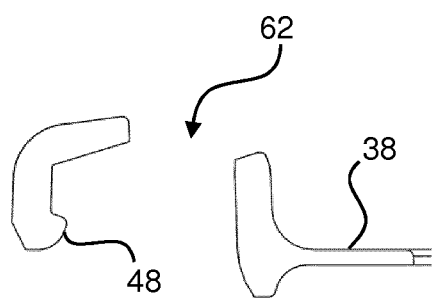

REMOVABLE HAND GRIP FOR WRAPPING AROUND A BAR

CROSS REFERENCE TO RELATED APPLICATION(S)

This application is a National Phase Filing under 35 C.F.R. § 371 of and claims priority to PCT Patent Application No. PCT/EP2016/071451, filed on Sep. 12, 2016, which claims the priority benefit under 35 U.S.C. § 119 of Netherlands Patent Application No. 2015498, filed on Sep. 24, 2015, the contents of each of which are hereby incorporated in their entireties by reference.

BACKGROUND

Some embodiments relate to a hand grip for wrapping around a bar such as a handle bar, a carry handle or a seat frame. Some embodiments also relate to an assembly including a bar and such a hand grip. Some embodiments further relate to a baby stroller or baby seat including such an assembly.

In order to get more (comfortable) grip onto a handle bar, such as a handlebar of a baby stroller, the handlebar is often provided with one or more hand grips. Handlebar grips are generally fixed onto the handlebar and cannot be replaced by the user. So when the grips become deteriorated over time or when the customer wants to customize/update his baby stroller the grips cannot be replaced by a new (nicer looking) piece.

To solve this issue, removable hand grips of various forms now exist for applications such as bicycles, for weightlifting bars or golf clubs. Many of these solutions require access to at least one open end of the handlebar; see for example publication U.S. Pat. No. 6,263,759, or JP2010110615A. However an open end of the handle bar is not always possible for applications such as handlebar of a baby stroller.

Removable hand grips are known that can be attached around a handle bar without the need for having an open end, see for example publication EP2368671A1, GB2506189A, and U.S. Pat. No. 5,511,445A. The problem with these grips is that they can easily rotate or otherwise move with respect to the handlebar. Overtime they can move to an unwanted position on the handle bar and they also fail to offer a sense of comfort, stability and firm grip to the user.

Patent publication CA2428867A1 tries to solve this problem by providing mechanisms to attach the hand grip to the handlebar. Publication CA2428867A1 utilizes threads and screws to attach a grip to a handle bar. However, such a grip is difficult to install for a non-technical person.

So there is a need for a removable hand grip for a handlebar which does not move and is easier to attach to the handlebar.

SUMMARY

Some embodiments therefore provide a hand grip for a bar which does not move and is easier to attach to and remove from the bar.

Some embodiments are directed to a hand grip for wrapping around a bar, the hand grip including a first elongated coupling member, a second elongated coupling member and a cover for providing a contact surface for a user, the cover being arranged between the first elongated coupling member and the second elongated coupling member, wherein at least one of the first and second elongated coupling member includes one or more protrusions arranged to be inserted into one or more holes or recesses of the bar. When mounted, the coupling members extend in a longitudinal direction of that part of the bar on which they are placed. By inserting the protrusions into the holes or recesses, the hand grip as a whole will be fixed relative to the bar and cannot be moved. Since no screws are used, the hand grip is easily removable from the bar once the protrusions are pulled out of the holes or recesses. So the hand grip can easily be removed for cleaning purposes or for customization of the hand grip by or for the user.

In an embodiment the protrusions are an integral part of the coupling members. For example, a coupling member with its protrusions can be made by way of moulding or 3D printing. In that case, the protrusions will be made out of the same material and can be firmly connected to the rest of the coupling member.

In an embodiment the first coupling member includes one or more pairs of protrusions of a first kind, and the second coupling member includes one or more protrusions of a second kind, wherein each pair of the protrusions of the first kind is arranged to be inserted into one of the holes or recesses, and wherein each of the protrusions of the second kind is arranged to be inserted into a space between two protrusions of one pair. Once inserted, the protrusions of the second kind will avoid that two protrusions of the first kind will get too close so that they may escape out of the hole in the bar.

In an embodiment the first coupling member includes one or more recesses, and the second coupling member includes one or more locking members arranged to cooperate with the recesses in the first coupling member. The locking mechanism will provide a secondary locking between the first and second coupling members, so as to make the connection with the bar more secure.

In an embodiment the second coupling member includes one or more openings giving access to an interior of the second coupling member so that a user is able to insert a pin into the second coupling member and unlock the two coupling members. By inserting the pin, such as the outer end of a screwdriver, the user is able to unlock the secondary locking in an easy manner. After this unlocking the protrusion of the second kind can be removed from between the protrusions of the first kind, that will still be inserted in the holes (or recesses) of the bar. Once two protrusions belonging to one pair or protrusions of the first kind, are able to bend towards each other, they can be removed out of the hole of the bar.

In an embodiment the first coupling member includes one or more protrusions of a first kind, and the second coupling member includes one or more protrusions of a second kind, wherein a respective one of the protrusions of the first kind is arranged to be inserted into one of the holes or recesses together with a respective one of the protrusions of the second kind. So in this embodiment only two protrusions fill up one hole or recess.

In an embodiment each of the protrusions of the first kind includes a thickening near or at its tip. The thickening is used to avoid the protrusions from escaping out of the hole or recess once the protrusions from both the first and second coupling member are inserted in the holes or recesses. Alternatively so-called click fingers could be used for the protrusions. The protrusions having a thickening will be inserted into their respective holes first, followed by the insertion of the protrusions having no thickening. A protrusion of the first kind together with a protrusion of the second kind will together substantially close the opening of a hole or a recess.

In an embodiment each of the protrusions of the first kind together with a corresponding one of the protrusions of the second kind substantially fill an opening of one of the holes or recesses once the hand grip is attached to the handlebar.

In an embodiment, the first and second coupling member are flexible at least in one dimension. This means that the coupling member can be mounted onto a curved part of a bar.

In an embodiment each of the first and second coupling member includes a number of coupling divisions connected via flexible connection parts. The coupling divisions may be relative stiff (i.e. stiffer than the connection part) and may be arranged to interact with coupling divisions of the other coupling member. The flexible connection parts provide flexibility so that the elongated coupling members can easily follow the curved bar.

In an embodiment the first and second coupling member each includes a strip for connection of the respective coupling members to the cover, for example by way of stitching or gluing. In an embodiment, the strips may have a thickness of less than 2 mm.

In an embodiment the respective strips are coupled to each other at both outer ends of the respective strips by two connections strips. Preferably the strips, the connection strips and the first and second coupling member are part of a single piece made out of plastic or any other suitable material. The strips can be relatively thin so that the cover can easily be stitched onto the frame. Alternatively, the cover could be glued onto the frame.

In an embodiment the first and second elongated coupling member are arranged to be coupled to each other. The first elongated coupling member may for example include male type connector, while the second elongated coupling member may include female connector, or the other way around.

In an embodiment the second elongated coupling member includes locks for locking the first elongated coupling member to the second elongated coupling member.

In yet a further embodiment the first coupling member includes one or more protrusions and the second coupling member includes one or more protrusions, and wherein the hand grip further includes one or more fixing members each having one or more fixing protrusions each of which being arranged to fill up a space between a protrusion of the one first coupling member and a protrusion of the second coupling member when being inserted in a hole or recess. The two coupling members may be configured in such a way that they together form an opening in a central part so as to provide a hole for a button arranged on the bar.

In an embodiment the cover includes at least one of a foam layer and a protection layer. A foam layer will increase the comfort for the user when holding the hand grip. The protection layer may include leather, artificial leather or fabric or any other suitable flexible material. Such materials will help to increase the comfort and customizability, while also protecting the foam layer.

Some embodiments are also directed to an assembly including a bar and a hand grip as described above, wherein the bar includes one or more holes and/or recesses for receiving the protrusions. Examples of bars with such holes or recesses are handlebars or carry handles.

Some embodiments are also directed to a baby stroller or a baby seat including such an assembly.

BRIEF DESCRIPTION OF THE DRAWINGS

These and other aspects of some embodiments are apparent from and will be elucidated with reference to the embodiments described hereinafter. In the drawings:

FIGS. 19 and 20 schematically show different perspective views of an embodiment of the second coupling member;

FIG. 21 schematically shows a cross section of the second coupling member along the line A-A in FIG. 20;

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EXEMPLARY EMBODIMENTS

Figure 1:
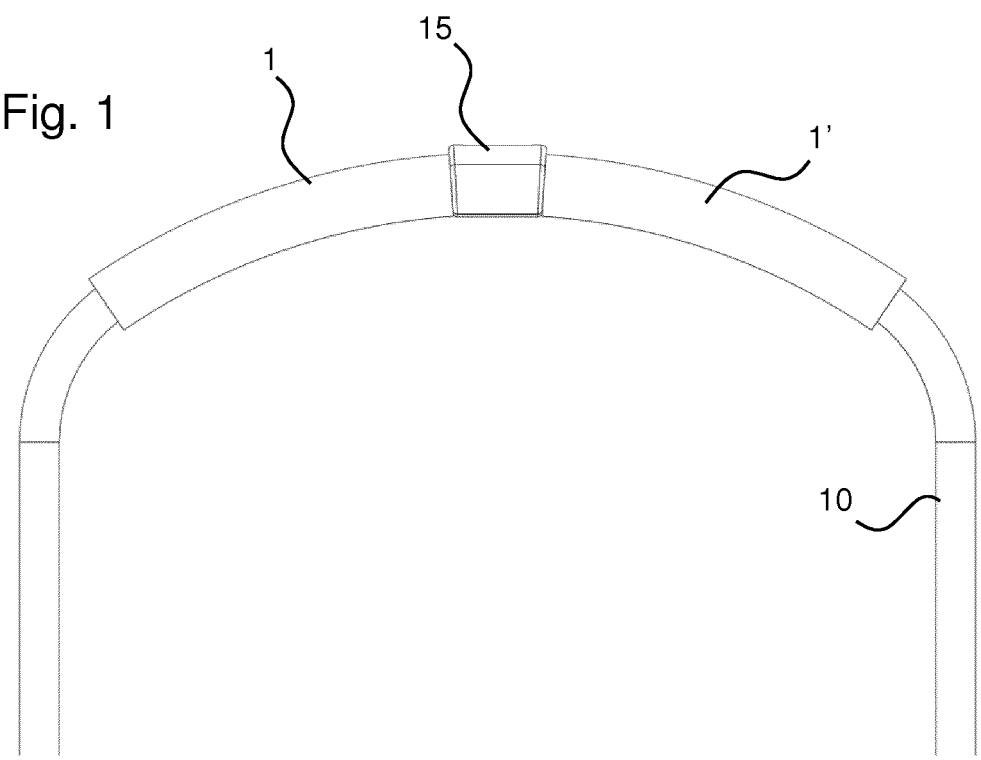
FIG. 1 schematically shows a perspective view of part of a handlebar of a baby stroller according to some embodiments.

FIG. 1 schematically shows a perspective view of part of a handlebar 10 of a baby stroller according to some embodiments. The baby stroller may further include a seat and wheels to as to transport a baby or a young child.

Attached to the handle bar 10 are two hand grips 1, 1' according to an embodiment. In between the two handgrips 1, 1' is a cup holder 15 which is not relevant for some embodiments. As can be seen from the view in FIG. 1, the handlebar 10 is slightly curved at the locations were the hand grips 1, 1' are attached.

Figure 2:
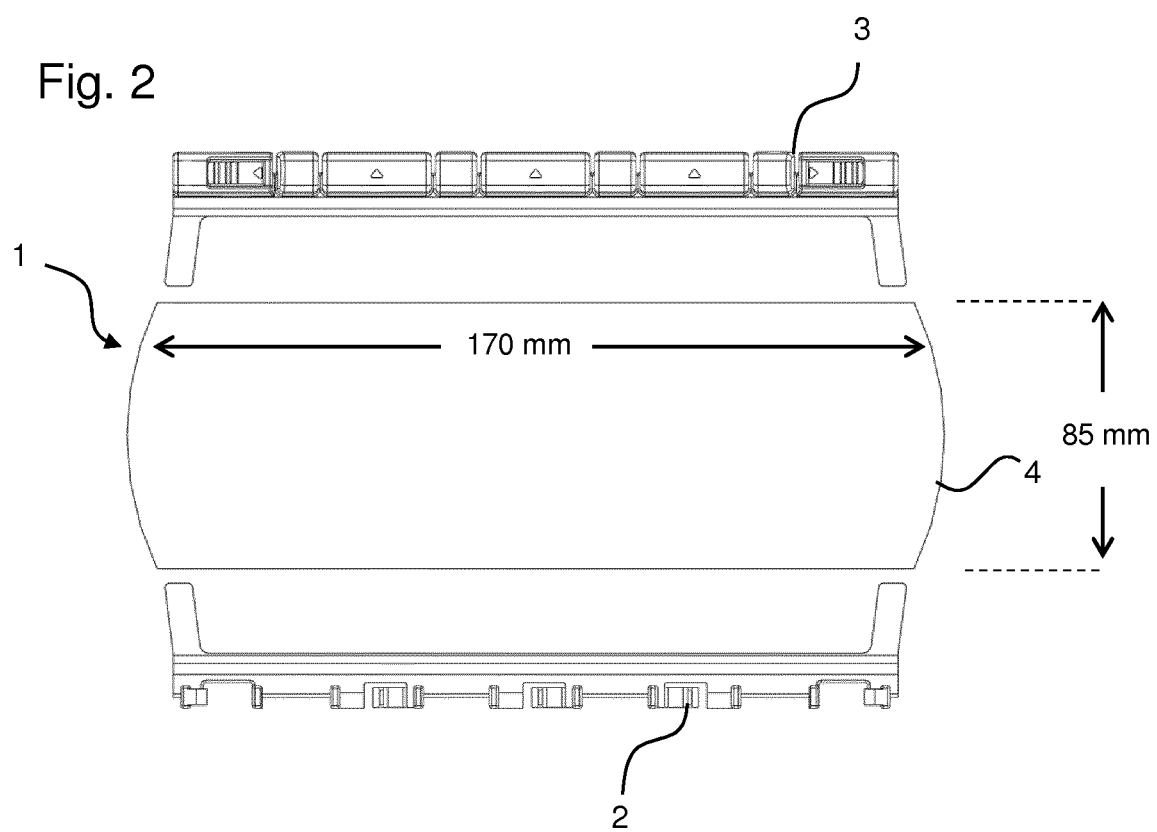
FIG. 2 schematically shows a top view of a disassembled hand grip.

FIG. 2 schematically shows a top view of a disassembled hand grip 1. The hand grip 1 includes a first elongated coupling member 2, a second elongated coupling member 3 and a cover 4. The cover 4 will be arranged between the first elongated coupling member 2 and the second elongated coupling member 3. The cover 4 is flexible so that when the first elongated coupling member 2 is positioned next or on top of the second elongated coupling member 3, the cover 4 will form a substantially tubular structure so as to surround part of the handlebar 10 as was shown in FIG. 1. In the example of FIG. 1 the cover 4 has two straight edges and two slightly curved edges. Such a form is advantageous or preferred when wrapping a hand grip around a slightly bended bar, such as a handlebar of a baby stroller. Exemplary values for the dimension of the cover 4 are 170 mm×85 mm×4 mm (l×w×th).

Figure 3:
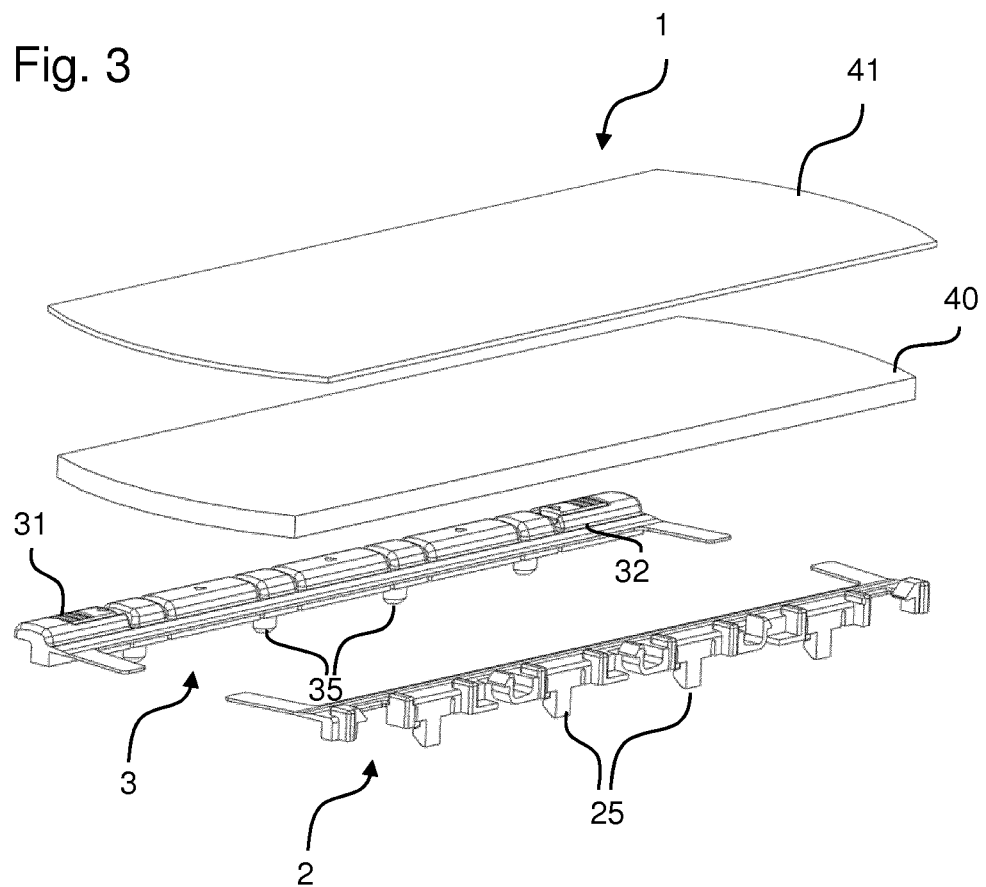
FIG. 3 shows an exploded view of the hand grip according to an embodiment wherein the cover includes a foam layer and a protection layer.

FIG. 3 shows an exploded view of the hand grip 1 according to an embodiment wherein the cover 4 includes a foam layer 40 and a protection layer 41. The foam layer may include EVA or any other compressible material so as to achieve some comfort for the user when holding the mounted hand grip 1. The protection layer 41 may be manufactured out of leather, artificial leather or fabric or any material suitable for covering the foam layer 40. Preferably the protection layer 41 is water and dirt resistant. It is noted that only one layer may be present, so only the foam layer 40 or only the protection layer 41.

Figure 4:
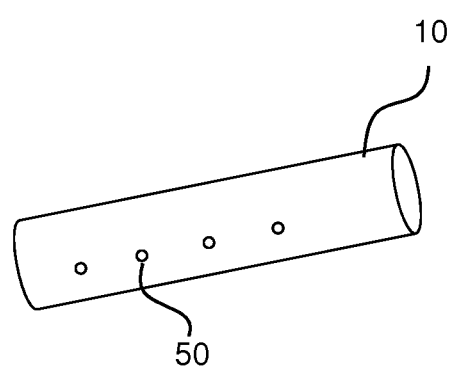
FIG. 4 shows an example of a handle bar having holes.

As can be seen from FIG. 2, the first and second elongated coupling member 2, 3 include a number of protrusions 25, 35 respectively. The protrusions 25, 35 are arranged to be inserted into respective holes or recesses of the handlebar 10. An example of a handle bar 10 having holes 50 is shown in FIG. 4. In the example of FIG. 4 the part of the handle bar 10 where the holes 50 are arranged is straight. It is noted that the hand grip 1 may be arranged to be attached to a straight part of a handlebar or to a curved part as was mentioned above. The number of holes 50 may vary. For each hand grip at least one hole or recess is needed. Typical values for the number of holes or recesses are between 3 and 8.

The protrusions 25, 35 may be an integral part of the coupling members 2, 3 respectively. So, each of the coupling members 2, 3 may be completely manufactured out of one piece which makes the coupling members 2, 3 more robust. For example, each of the coupling members 2, 3 may be made out of one piece of plastic (e.g. PA-6) by way of e.g. moulding or 3D printing or any other suitable technique. Other materials are also possible such as rubber or metal.

In the example of FIG. 3, the second coupling member 3 includes two securing mechanisms 31 and 32 arranged to secure the first coupling member 2 onto the second coupling member 3. In this example each of the securing mechanisms 31, 32 includes a pivotable flap that can be closed once the first coupling member 2 is coupled to the second coupling member 3. It is noted that instead of a pivotable flap, other types of coupling members could be used such as slidable locking mechanisms, as will be discussed later on. It is further noted that the number of coupling members may be more than 2 such as 3, 4, etcetera.

Figure 5:
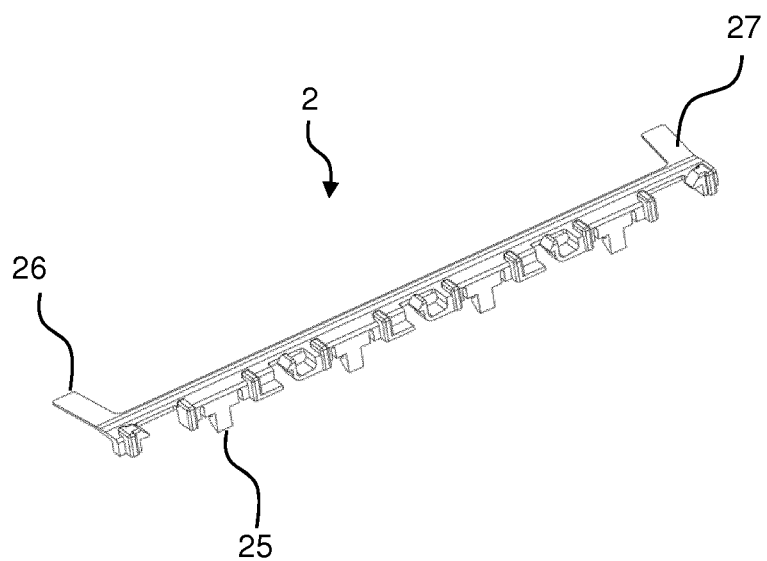
FIGS. 5-7 schematically show different perspective views of an embodiment of the first coupling member.
Figure 6:
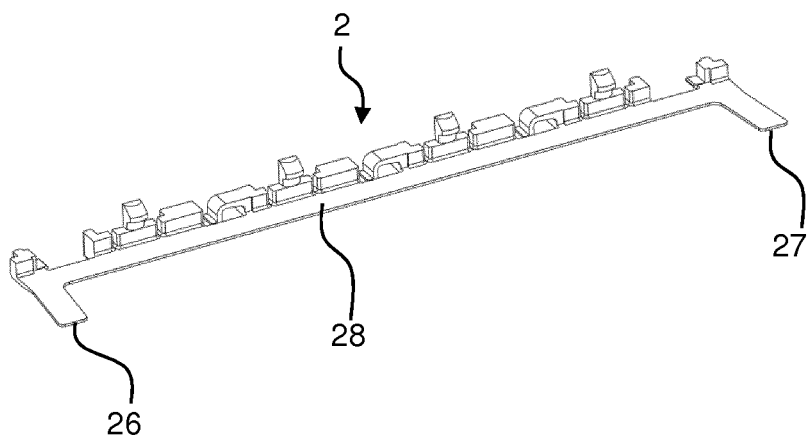
Figure 7:
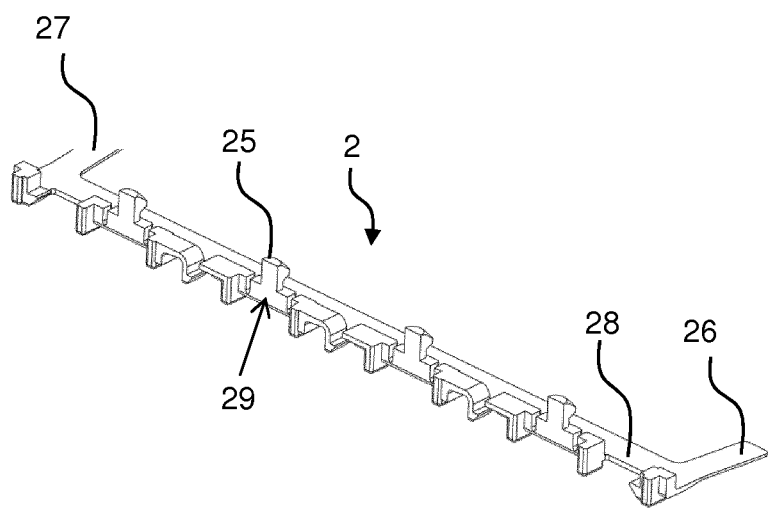
Figure 8:
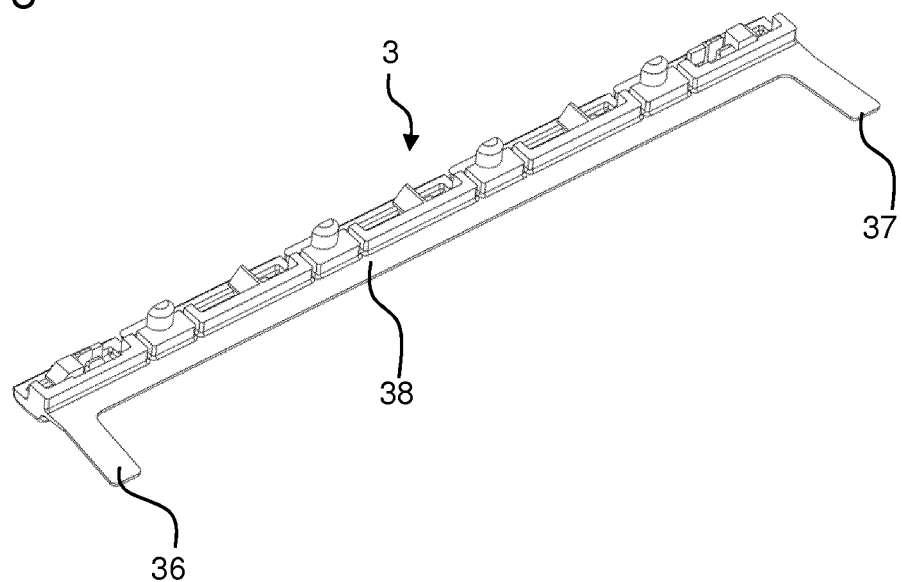
FIGS. 8-11 schematically show different perspective views of an embodiment of the second coupling member.

FIGS. 5-7 schematically show different perspective views of an embodiment of the first coupling member 2. The first coupling member 2 includes two end strips 26, 27 and a main strip 28 running parallel to a main axis of the coupling member 2. The strips 26, 27 and 28 may be an integral part of the coupling member 2 and may be made out of the same material as the other parts. The strips 26, 27, 28 are relatively thin and are used to connect the cover 4 to the coupling member 2 by way of gluing or stitching.

In the embodiment of FIG. 5-7, each of the protrusions 25 of the first coupling member 2 includes a thickening at its tip. The purpose of the thickening will be explained later on. As can be seen from FIG. 7, the protrusions 25 have a flat surface 29 at a side that will engage with the protrusions of the other coupling member.

FIGS. 8-11 schematically show different perspective views of an embodiment of the second coupling member 3. The second coupling member 3 includes two end strips 36, 37 and a main strip 35 running parallel to a main axis of the coupling member 3. Similar to the strips of the first coupling member 2, the strips 36, 37 and 38 of the second coupling member 3 may be an integral part of the coupling member 3 and may be made out of the same material as the other parts. The strips 36, 37, 38 are relatively thin and are used to connect the cover 4 to the coupling member 3 by way of gluing or stitching.

Figure 9:
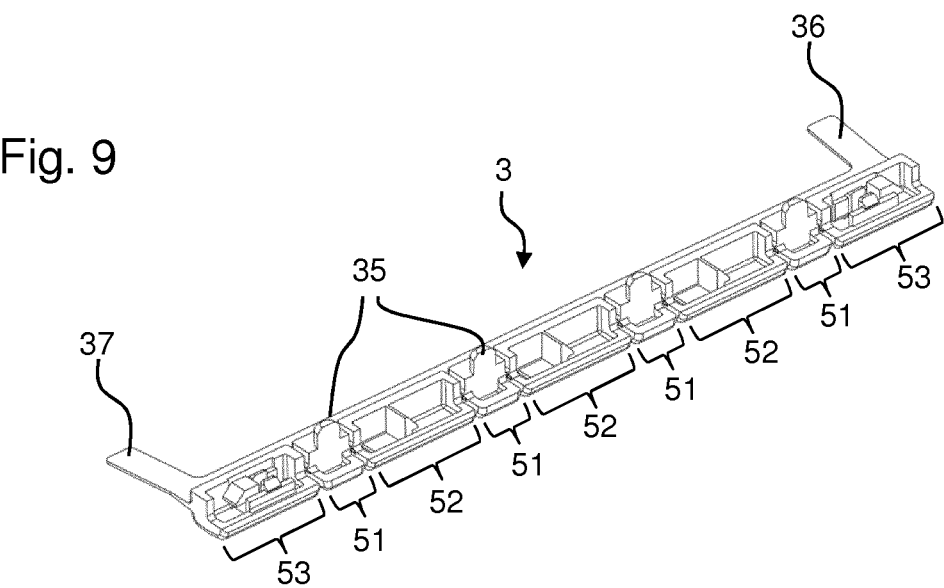

As best can be seen from FIG. 9, the second coupling member 3 is divided in a number of coupling divisions. In the example of FIG. 9, the coupling member 3 includes four so-called protrusion divisions 51 where the protrusions 35 are positioned. The protrusion divisions 51 alternate with so-called intermediate division 52. At the outer ends, two so-called securing divisions 53 are arranged. The respective divisions 51, 52, 53 are connected to each other but are separated by way of grooves 56. The respective divisions 51, 52, 53 are not flexible as such, but due to the grooves 56, the coupling member 3 forms a chain of divisions which is flexible, i.e. bendable, at least in one plane. It is noted that the sequence of the divisions can be altered as can the number of divisions.

Also the divisions can be combined to each other to obtain one or two different divisions.

Figure 10:
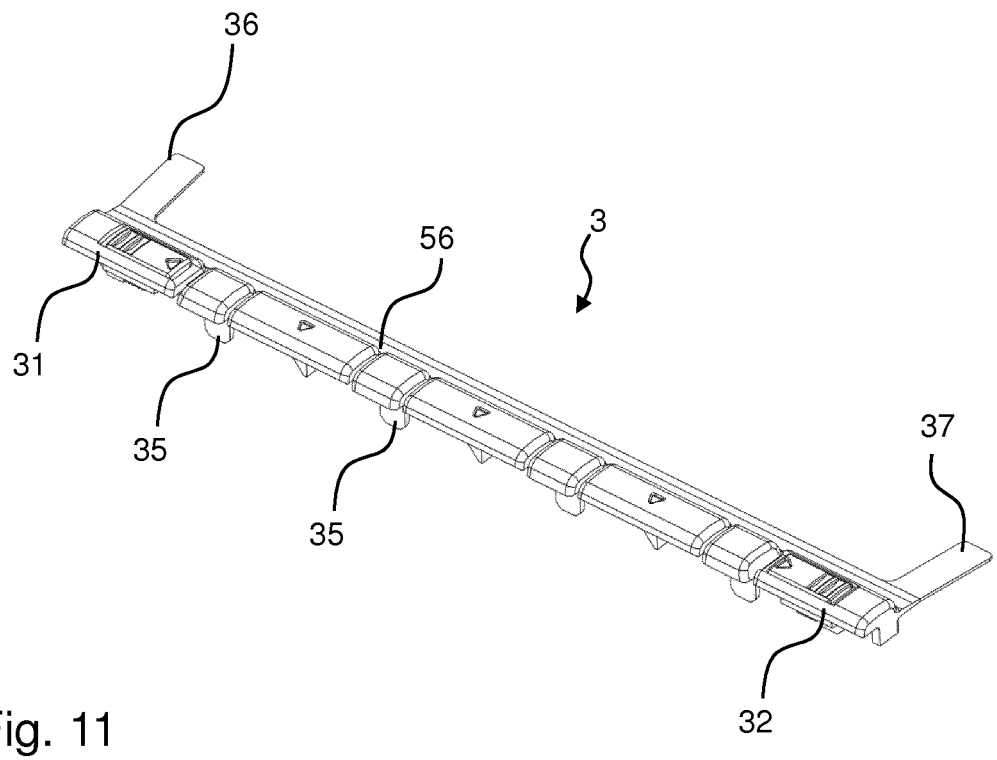
Figure 11:
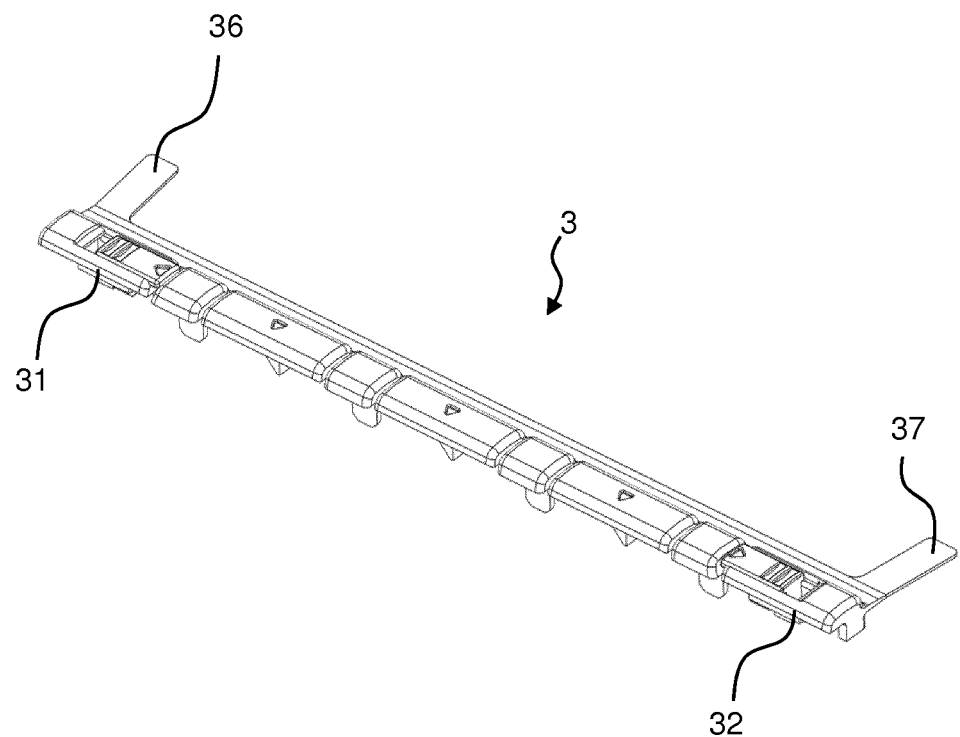

In the embodiment of FIGS. 10 and 11 the second elongated coupling member 3 includes locks for locking the first elongated coupling member 2 to the second elongated coupling member 3. In the example of FIGS. 10 and 11 the locks include two movable slides 31, 32 arranged at both outer ends of the second coupling member 3. The slides 31, 32 are part of a locking mechanism that interacts with structures of the first coupling member 2. Each of the slides 31, 32 can be moved by a user from an unlocked position, see FIG. 10, to a locked position, see FIG. 11.

Figure 12:
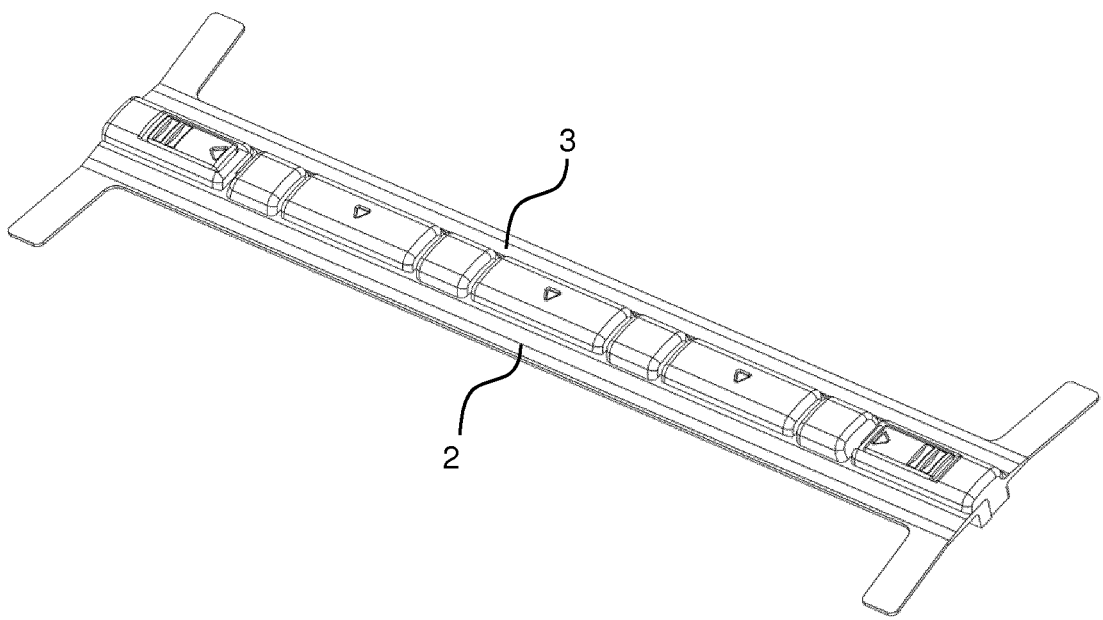
FIGS. 12 and 13 show two different perspective views of the first and second coupling members.
Figure 13:
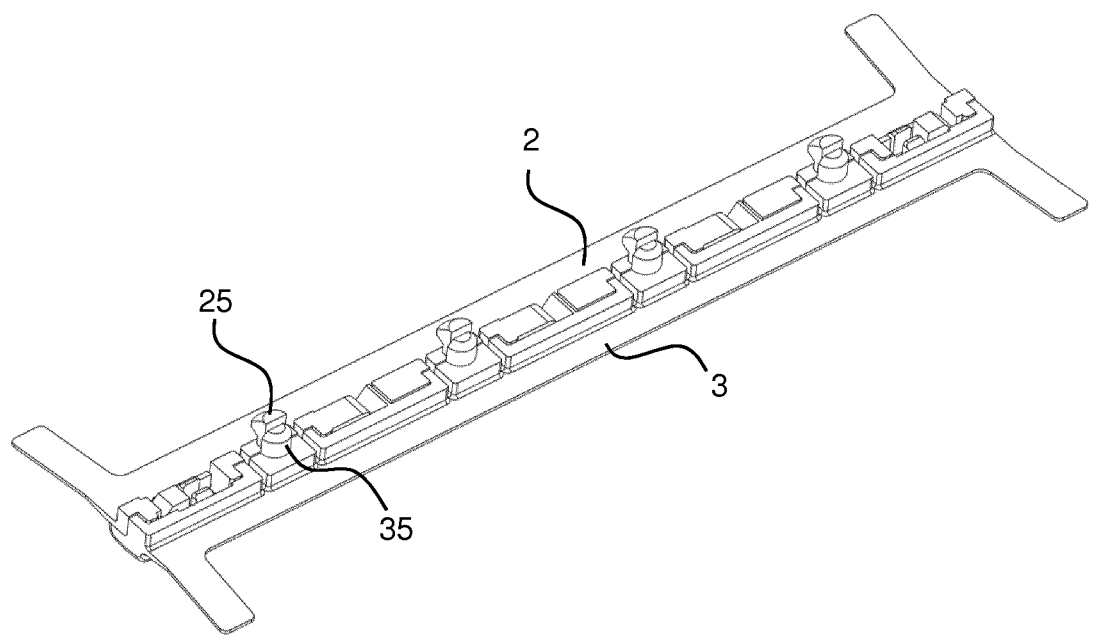

FIGS. 12 and 13 show two different perspective views of the first and second coupling members 2, 3. In FIGS. 12 and 13 the cover 4 is not shown for reasons of simplicity. FIG. 13 shows the side of the coupling members 2, 3 which in use, faces the handle bar 10. As can be seen from FIG. 13, each of the protrusions of the first coupling member 2 meets one of the protrusions of the second coupling member 3. In this embodiment, the first coupling member 2 includes one or more protrusions of a first kind 25, and the second coupling member 3 includes one or more protrusions of a second kind 35, wherein the protrusions of the first kind 25 are different from the protrusions of the second kind 35. In the example of FIG. 13, the protrusions of the first kind 25 are longer than the protrusions of a second kind 35. Furthermore, the protrusions of the first kind 25 each have a thickening at their tip, whereas the protrusions of a second kind 35 do not.

Figure 14:
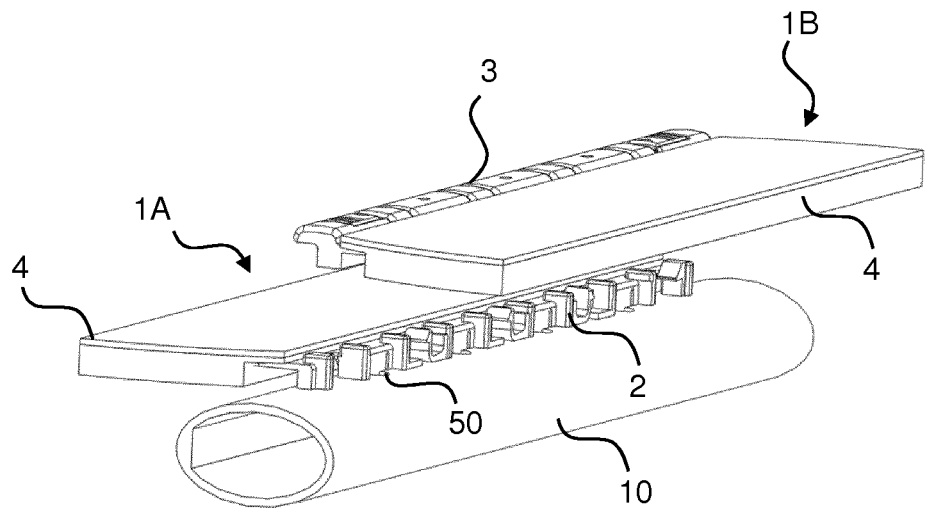
FIG. 14 is a perspective view of the handlebar with two parts of the hand grip 1 shown.
Figure 15:
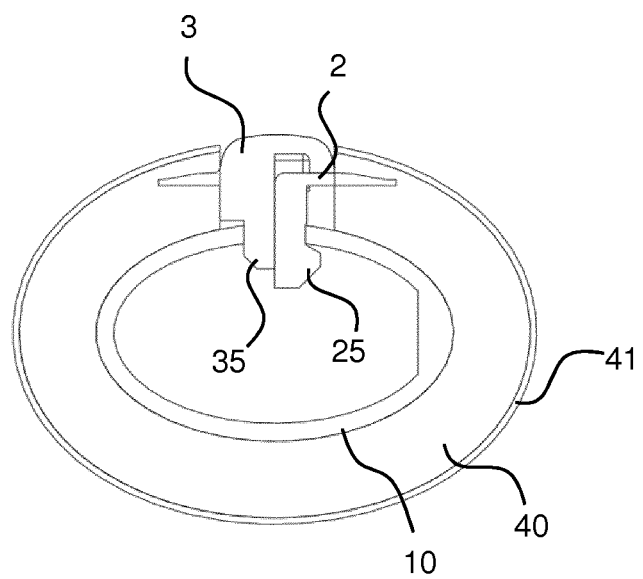
FIG. 15 shows a cross section of the handlebar and the attached hand grip.

FIG. 14 is a perspective view of the handlebar 10 with two parts of the hand grip 1 shown, referred to as part 1A and part 1B. It should be clear to the reader that in fact parts 1A and 1B are part of one hand grip where only one cover 4 is present which is arranged between the first and second coupling member 2, 3. FIG. 14 shows a situation after coupling the part 1A to the handle bar 10. The protrusions 25 (not visible in FIG. 14) of the first coupling member 2 are inserted into the holes 50 of the handlebar 10. Once the protrusions 25 of the first coupling member 2 are inserted, the second coupling member can be coupled to the first coupling member 2 wherein the protrusions 35 of the second coupling member 3 are inserted into the holes 50 next to the protrusion 25 of the first coupling member 2, see FIG. 15. FIG. 15 shows a cross section of the handlebar 10 and the attached hand grip 1. As can be seen from FIG. 15, the cover 4 (i.e. foam layer 40 and protection layer 41) together with the two coupling members 2, 3 are surrounding the handlebar 10.

Each of the protrusions of the first kind 25 together with a corresponding one of the protrusions of the second kind 35 substantially fill an opening of one of the holes or recesses once the hand grip. When inserted into one of the holes 50, each of the protrusions 35 of the second coupling member 3 forces a protrusion 25 of the first coupling member 2 to the edge of the hole 50. Due to this forcing and the fact that each of the protrusion 25 has a thickening, the coupling members will become firmly attached to the handlebar 10.

Because in this embodiment the first and second elongated coupling member 2, 3 are coupled to each other, the second coupling member 3 will not let loose from the first coupling member 2. The additional locks 31, 32 will further secure the attachment to the handlebar 10.

It is noted that instead of holes, the handlebar 10 may have recesses which receive the protrusions 25, 35. Due to the insertion of the protrusion into the holes or recesses, the coupling members will not be able to shift. The whole handgrip 1 will stay on its place once attached to the handlebar 10.

It is further noted that it is conceivable that the coupling members only mate with the handlebar 10 and not with each other. For example, the coupling members may be arranged in such a way that they can be positioned next to each other in the mounted situation and that each of the coupling members include protrusions which are inserted in to the holes or recesses. In such embodiment, the intermediate divisions 52 would be absent or at least not arrange to couple the coupling members to each other.

Figure 16:
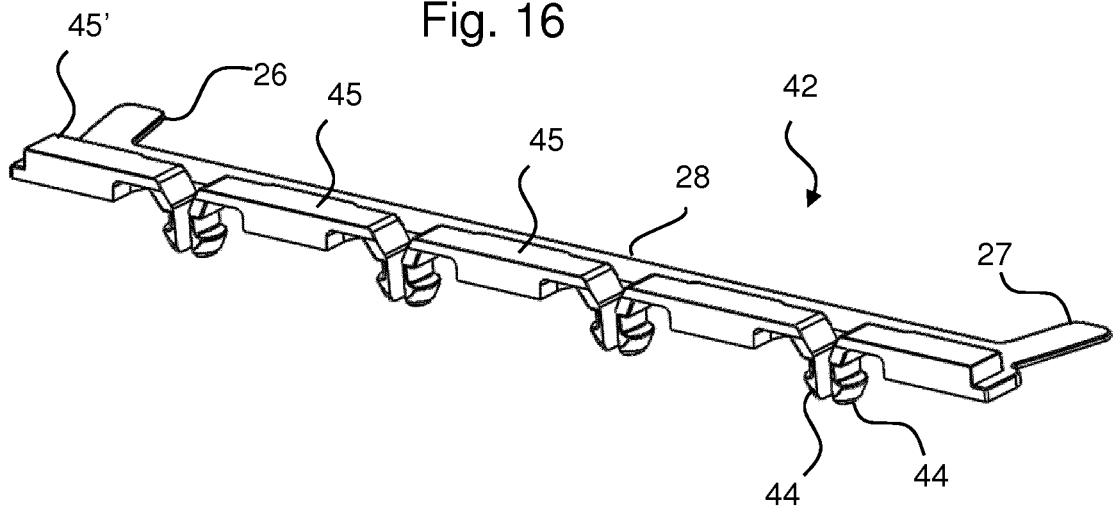
FIGS. 16 and 17 schematically show different perspective views of a further embodiment of the first coupling member.
Figure 17:
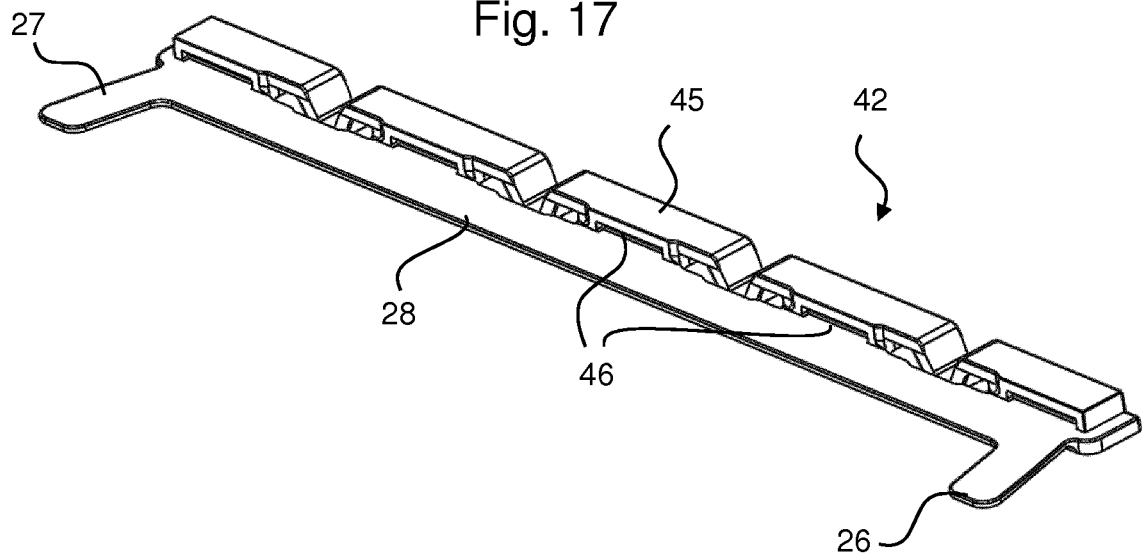

FIGS. 16 and 17 schematically show different perspective views of a further embodiment of the first coupling member 42. The first coupling member 42 includes two end strips 26, 27 and a main strip 28 running parallel to a main axis of the coupling member 42. The strips 26, 27 and 28 may be an integral part of the coupling member 42 and may be made out of the same material as the other parts. The strips 26, 27, 28 are relatively thin and are used to connect the cover 4 to the coupling member 42 by way of gluing or stitching. In this embodiment, the first coupling member 42 includes a plurality of protrusions 44 which are arranged in pairs. The protrusions 44 belonging to one pair are distant from each other, resulting in a space which space may be in the range of 0.5-2 mm, but other dimensions are possible.

The first coupling member 42 also includes a number of bridges 45 which include elongated parts connecting two protrusions 44, except the bridges 45' at the outer ends of the coupling member 42. The bridges 45, 45' are stiffer than the main strip 28, but since the bridges 45, 45' are connected to each other via the main strip 28, the coupling member as a whole is still flexible so as to be easily connected to a curved bar.

As can be seen in FIG. 17, the coupling member 42 includes a number of lock recesses 46 arranged in the bridges 45, 45' at the side of the main strip 28. The lock recesses 46 are arranged to receive hooks of a second coupling member, which will be described below.

Figure 18:
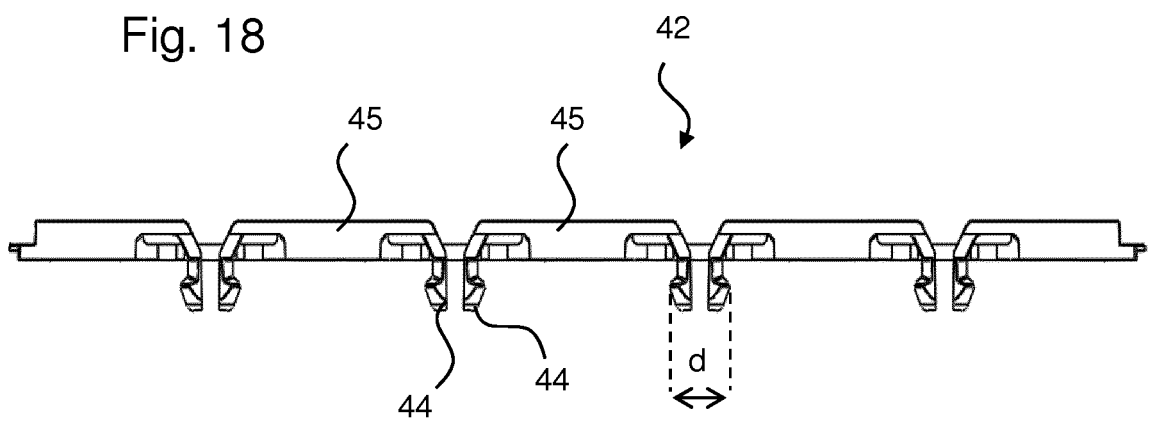
FIG. 18 schematically shows a side view of the embodiment of FIGS. 16 and 17.

FIG. 18 schematically shows a side view of the embodiment of FIGS. 16 and 17. Each of the protrusions 44 of the first coupling member 42 includes a thickening at its tip. As can be seen from FIG. 18, the protrusions 44 have a flat surface at a side facing the protrusion of the same pair. Each pair of protrusions is arranged to be inserted into one hole or recess 50 of the bar 10, see also FIG. 4.

Due to their design and the materials used, such as plastic, the protrusions 44 are flexible to a certain extent. Preferably, a distance d between the outer surfaces of the protrusions 44 at the position of the thickening (see FIG. 18) is larger than a diameter of a hole or recess 50 in an associated bar. During insertion of the protrusions into a hole (or recess), the protrusions 44 will slightly be bent towards each other and, after insertion, they will bend back to the original form and as a results they will be hooked into the hole or recess 50. When using a plastic coupling member and a metal bar, the insertion of the protrusions will produce a click sound. For this reason the pairs of protrusions 44 are also referred to as clicker locks.

FIGS. 19 and 20 schematically show different perspective views of an embodiment of the second coupling member 43, which can be coupled to the first coupling member of FIGS. 16-18. The second coupling member 43 includes two end strips 36, 37 and a main strip 38 running parallel to a main axis of the coupling member 43. Similar to the strips of the first coupling member 2, the strips 36, 37 and 38 of the second coupling member 43 may be an integral part of the coupling member 43 and may be made out of the same material as the other parts. The strips 36, 37, 38 are relatively thin and can be used to connect the cover 4 to the coupling member 3 by way of gluing or stitching.

The second coupling member 43 includes a number of protrusions 47 which are also referred to as clicker lock blockers 47. The clicker lock blockers 47 in this example are relatively thin box shaped protrusions arranged to be inserted between a pair of protrusions 44 of the first coupling member. Once inserted in between a pair of protrusions 44, a clicker lock blocker 47 blocks the protrusions 44 and avoids the protrusions 44 from coming closer together. As a result a firm connection between the coupling members and the bar is possible. It is noted that the clicker lock blockers 47 may vary in shape and size as long as they function as blockers between two protrusions 44 of the first coupling member 42. They may for example be pin shaped, also depending on the specific shape of the inner walls of the protrusions 44.

As best can be seen from FIG. 20, the second coupling member 43 is divided in a number of coupling divisions 49. In the example of FIGS. 19 and 20, the coupling member 43 includes five divisions 51 wherein the protrusions 47 are positioned at an interface between two divisions 49. At a side opposite of the side at which the protrusion 47 are arranged, each of the divisions 49 includes an opening 62. The divisions 49 are connected to each other but are separated by way of grooves 63.

FIG. 21 schematically shows a cross section of the second coupling member 43 along the line A-A in FIG. 20. In FIG. 21 the hook 48, also referred to as locking member 48, is shown and also the main strip 38. Furthermore one of the opening 62 is visible.

Figure 22:
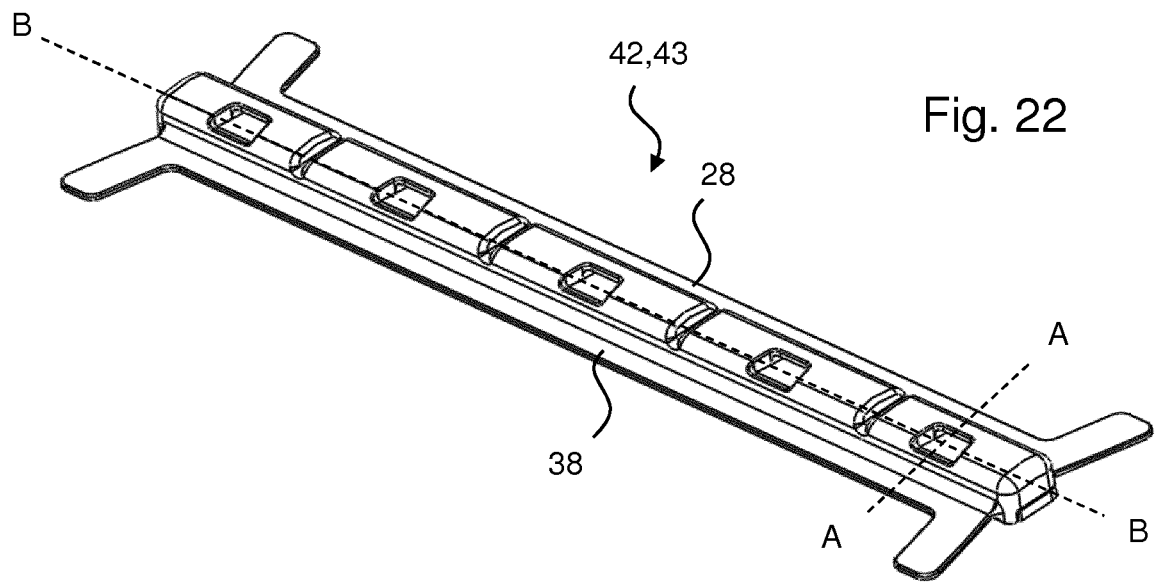
FIGS. 22 and 23 schematically show different perspective views of the first and second coupling member of the embodiment of FIGS. 16 and 19.
Figure 23:
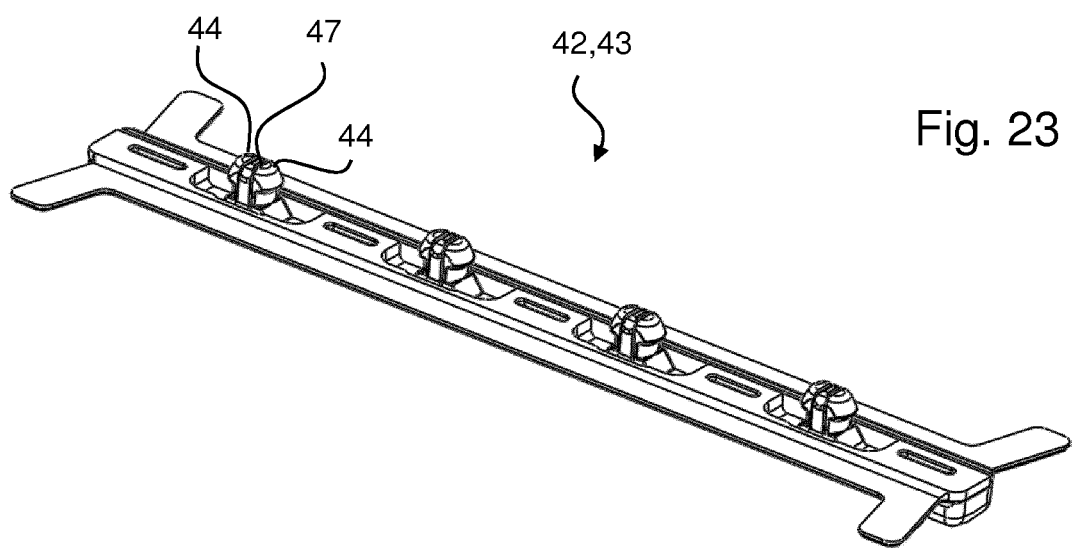
Figure 25:
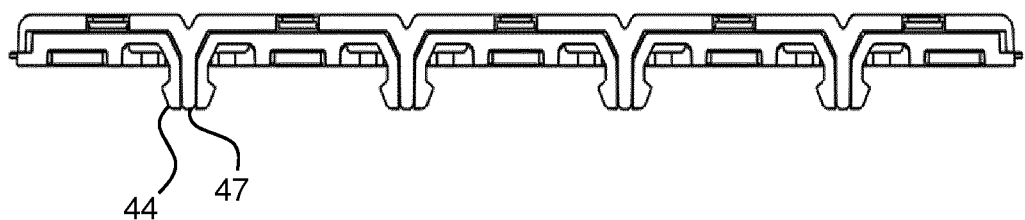
FIG. 25 shows a cross section of the coupled coupling members along a line B-B in FIG. 22.

FIGS. 22 and 23 schematically show different perspective views of the first and second coupling member 42, 43 of the embodiment of FIGS. 16 and 19. In FIGS. 22 and 23 the two coupling members 42, 43 are coupled. As can be seen from FIG. 23, each time two protrusions 44 of the first coupling member 42 are separated from each other by an associated clicker lock blocker 47 of the second coupling member 43. This can better be seen in FIG. 25 which shows a cross section of the coupled coupling members along a line B-B in FIG. 22.

Figure 24:
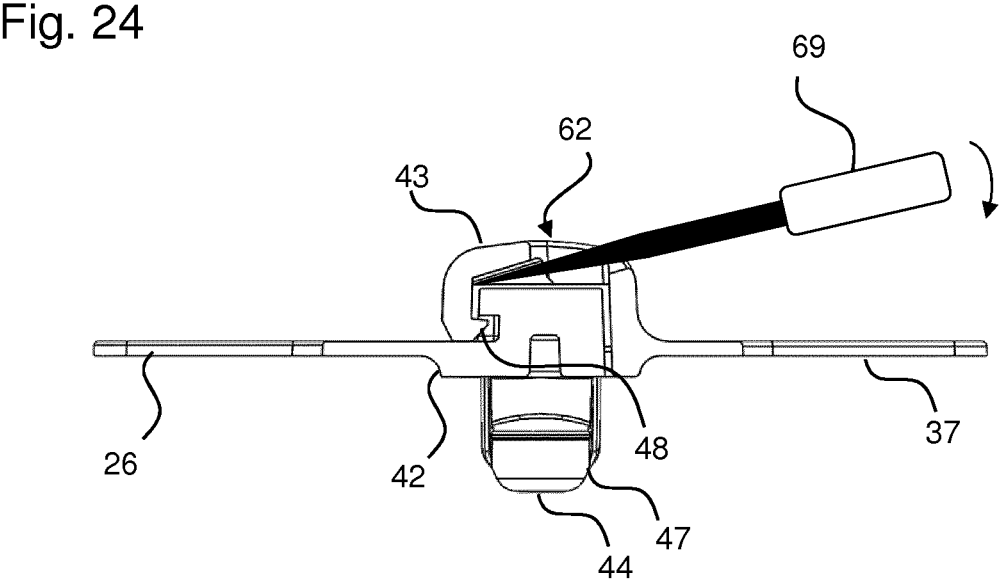
FIG. 24 shows an open side view of the coupled coupling members and a screwdriver for unlocking the coupling members.

FIG. 24 shows an open side view of the two coupling members 42, 43. In FIG. 24 a screw driver is shown which can be used to first push the hooks 4 out of the holes 46 and to then press the screwdriver downwards to release the lock between the two coupling members 42, 43. An arrow in FIG. 24 indicates a downward movement of the handgrip of the screwdriver which indicates that a user can use the screwdriver 69 to release the coupling by secondly use the screwdriver as a crowbar. It is noted that the screw driver 69 is not necessarily drawn to scale. Furthermore, the movement of the direction may be upward or side wards depending on the orientation of the holes or recesses 50 in the bar 10.

As a result, a user can easily detach the hand grip 1 from the handlebar 10. The second coupling member 3; 43 can be decoupled from the first coupling member after which the first coupling member 2; 42 can be removed from the handlebar 10. Once both coupling members are loose, the whole hand grip 1 is loose and can be removed. So the advantages of the removable hand grip is that it can easily be replaced by another one or it can easily be remove for cleaning purposes. Furthermore, the whole device including the handlebar 10 is made customizable. The user can choose a favourable colour, size, grip type and/or material for the hand grip 1.

Figure 26:
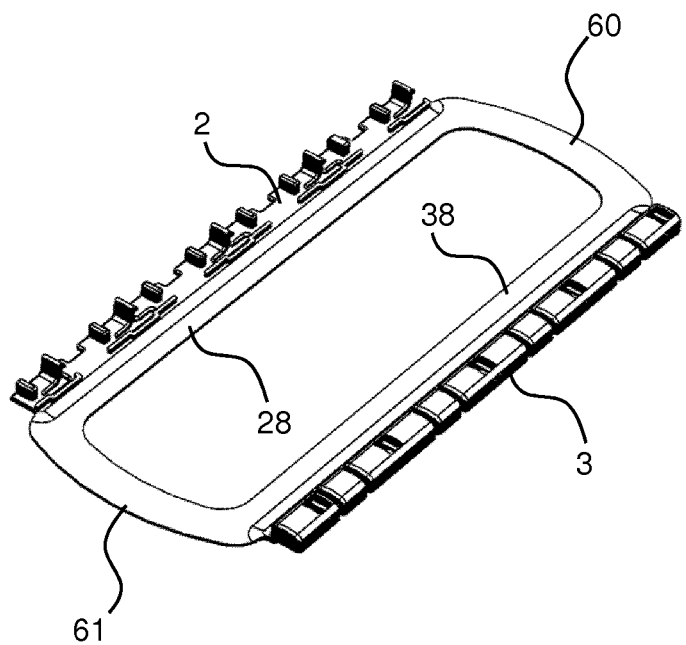
FIG. 26 is a perspective view of an example of the coupling members according to an embodiment.

FIG. 26 is a perspective view of an example of the coupling members 2, 3 according to an embodiment. In this embodiment the strips 28, 38 of the respective coupling members 2, 3 are connected to each other at both outer ends by connection strips 60, 61. Similar to the strips 28, 38, the connection strips 60, 61 may be relatively thin and can be used to connect the cover 4 (see FIG. 2) to the coupling members 2, 3 by way of gluing or stitching. The coupling members 2, 3, the strips 28, 38 and the connection strips 60, 61 may be one integral part. This part may be manufactured out of plastic or any other flexible material by way of moulding or 3D printing or any other suitable technique.

Figure 27:
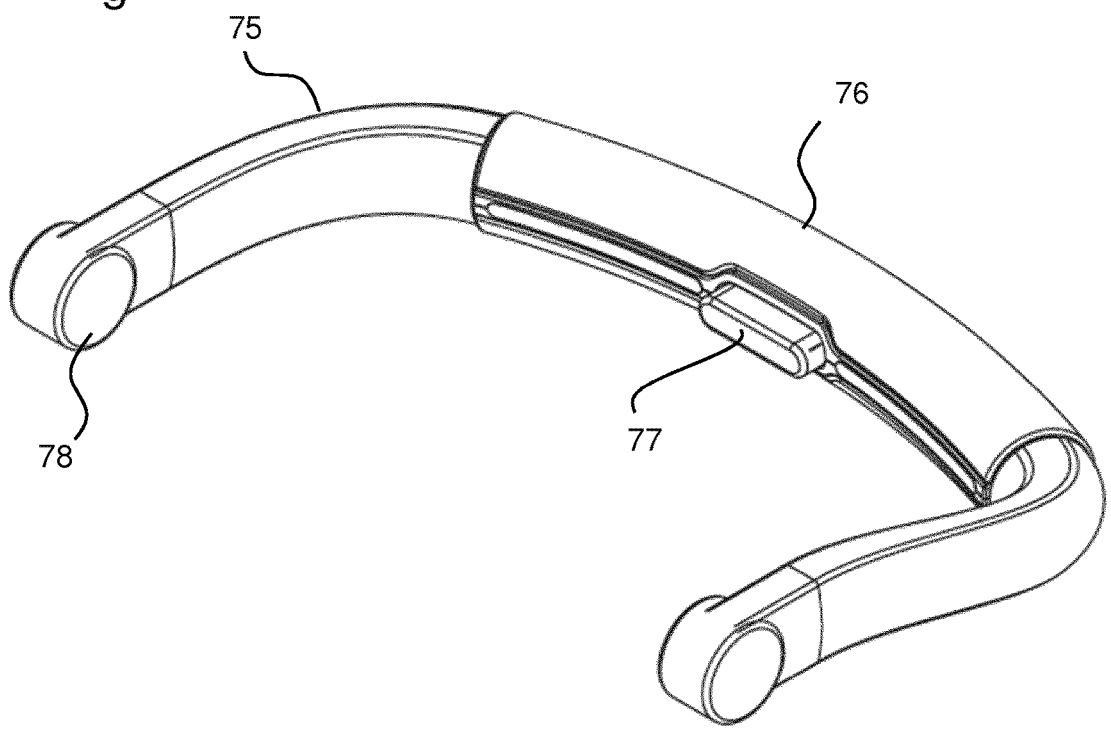
FIG. 27 is perspective view of a handle bar and a hand grip wrapped around the handle bar according to a further embodiment.

FIG. 27 is perspective view of a handle bar 75 and a hand grip 76 wrapped around the handle bar 75 according to a further embodiment. In this case the handle bar 75 includes a button 77. The handle bar 75 includes two outer ends 78 arranged to connect the handle bar 75 to for example a baby stroller (not shown).

Figure 28:
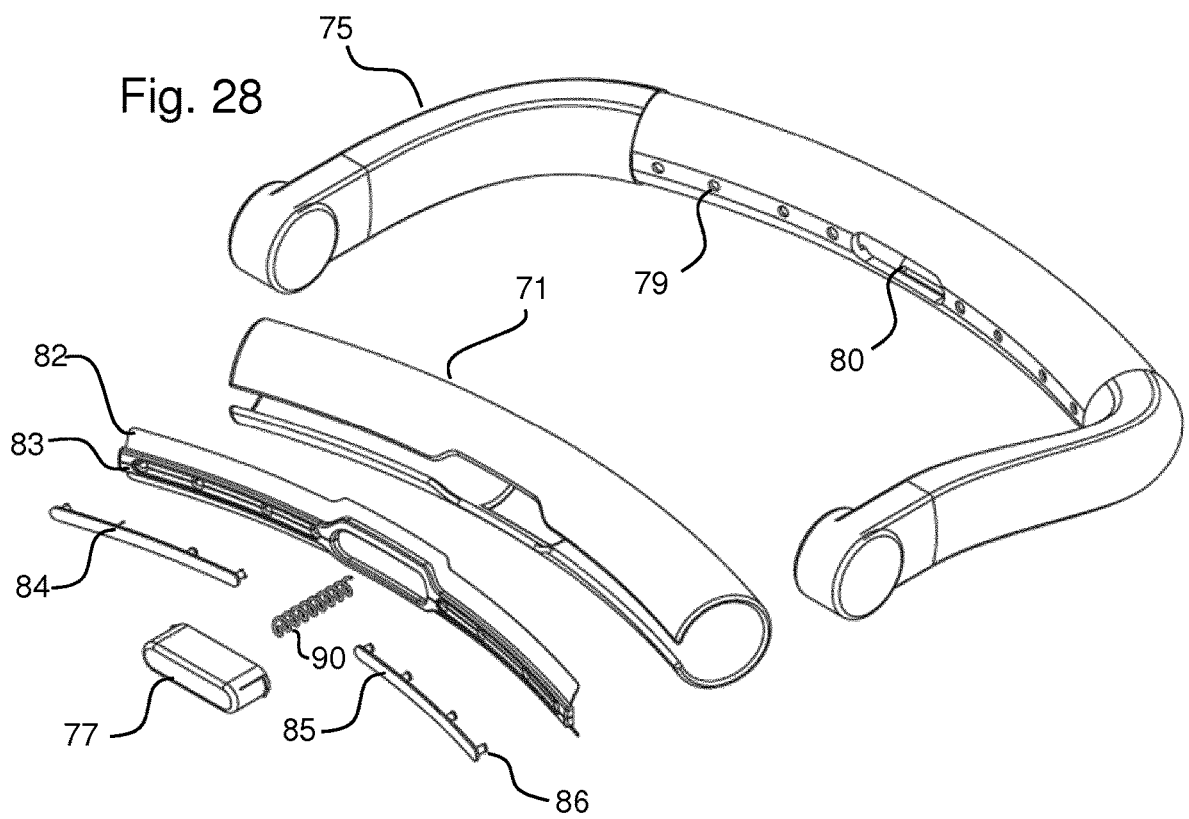
FIG. 28 shows an exploded view of the arrangement of FIG. 27.

FIG. 28 shows an exploded view of the arrangement of FIG. 27. The handle bar 75 includes a number of holes 79 and a central opening 80 for receiving the button 77. In this embodiment, the hand grip 76 includes a first and second identical coupling members 82, 83 and two identical fixing members 84, 85 each having one or more fixing protrusions 86. The two fixing members 84, 85 may be made out of the plastic or rubber or any suitable material. It is noted that the fixing protrusions 86 may be made of another material then the rest of the fixing member bodies 85.

In this embodiment, the two coupling members 84, 85 are configured in such a way that they together form an opening in a central part so as to provide a via for the button 77. The button 77 may be functioning as an activation button for releasing or activating a coupling mechanism inside the handle bar or in the stroller or seat. A spring 90 is provided so as to push the button 77 back to its place after having been pushed in by a user.

Figure 29:
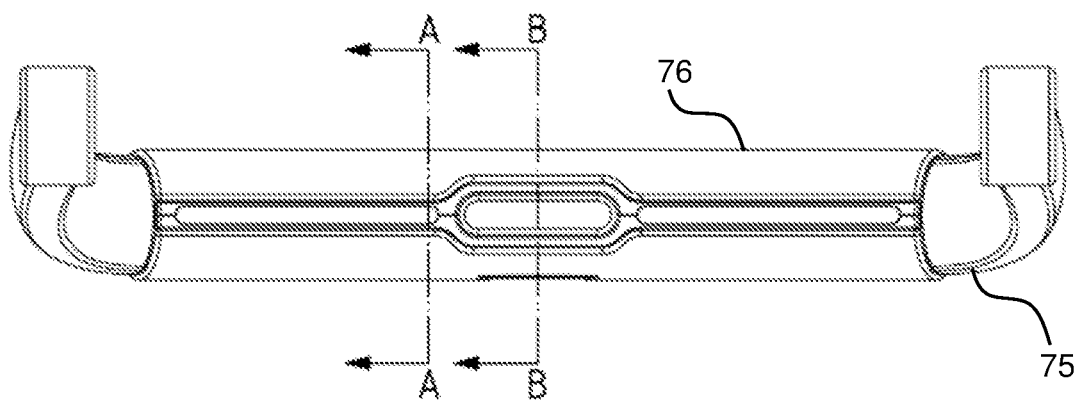
FIG. 29 shows a front view of the inside of the handle bar having the hand grip wrapped around it.
Figure 30:
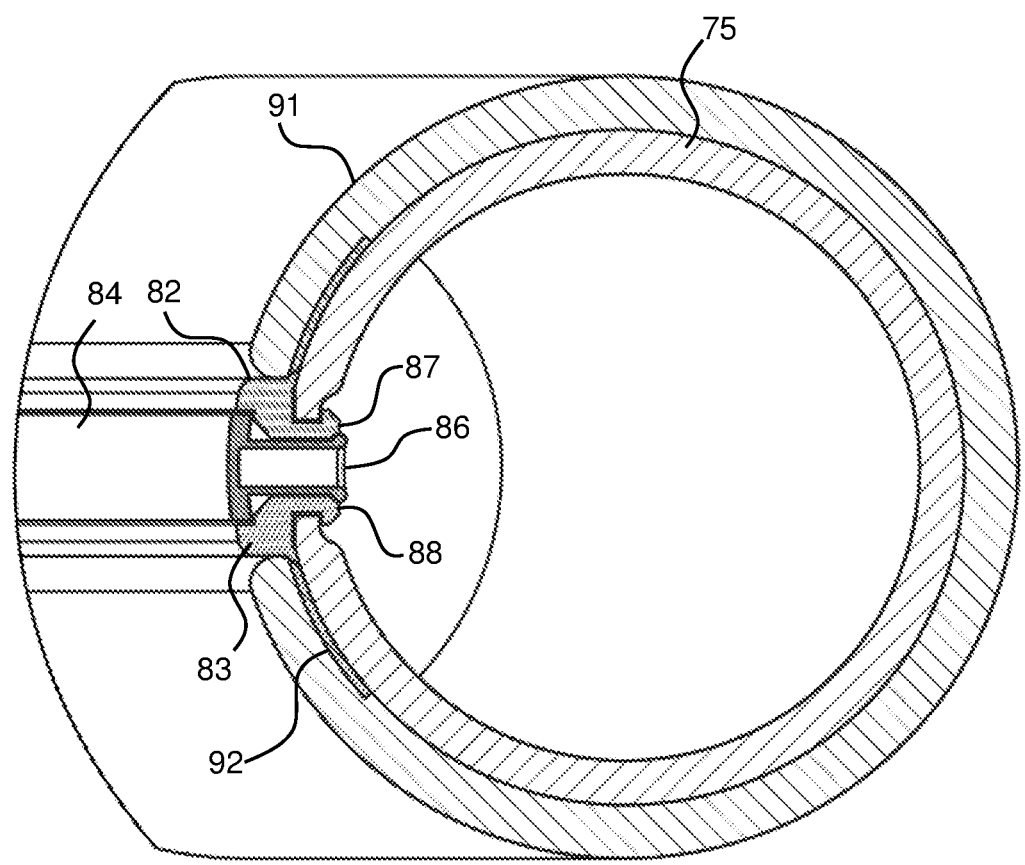
FIG. 30 shows a cross section of the arrangement of FIG. 29 at the line A-A shown in FIG. 29.

FIG. 29 shows a front view of the inside of the handle bar 75 having the hand grip 76 wrapped around it. FIG. 30 shows a cross section of the arrangement of FIG. 29 at the line A-A shown in FIG. 29. FIG. 30 shows the bar 75 and the hand grip comprising a liner 91, which can be a combination of fabric materials, i.e. foam and leather, attached, by means of sewing them in a folded seam, to the strips 92 of the two coupling members 82, 83. In FIG. 30 is it is shown that the fixing protrusions 86 of the fixing member 84 is inserted in between protrusions 87, 88 of the respective coupling members 82, 83 when inserted in a hole of the bar 75.

Figure 31:
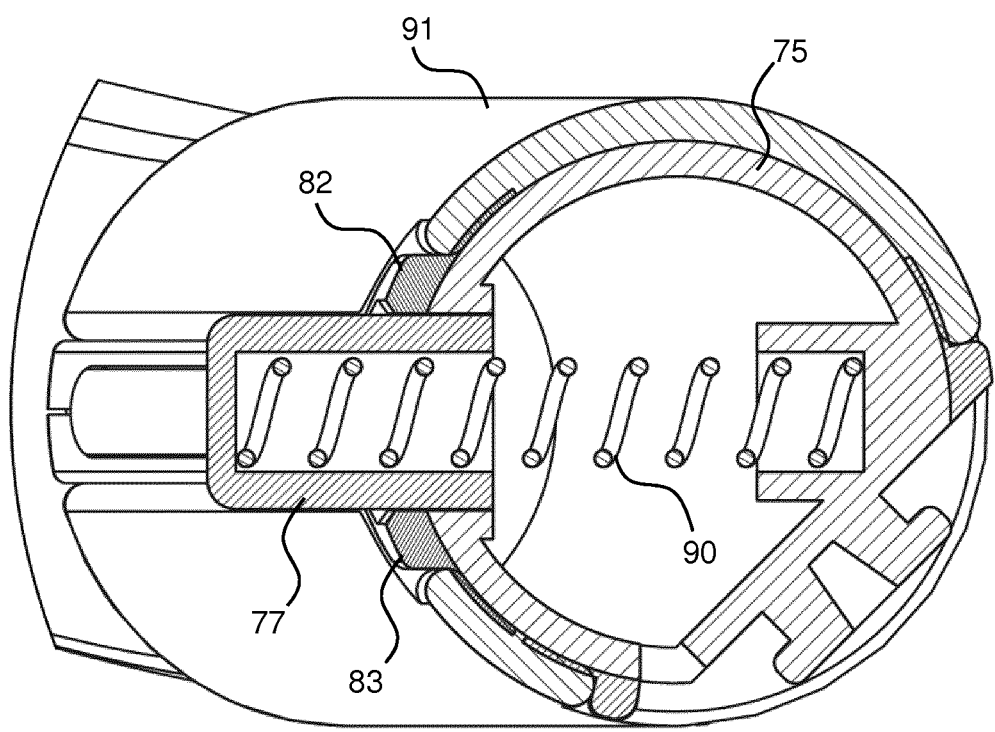
FIG. 31 shows a cross section of the arrangement of FIG. 29 at the line B-B shown in FIG. 29.

FIG. 31 shows a cross section of the arrangement of FIG. 29 at the line B-B shown in FIG. 29. From FIG. 29 it can be seen that the spring 90 is arranged in the button 77 and will push the button back once it has been pressed. The two coupling members 84, 85 together form an opening in a central part so as to provide a via for the button 77.

Some embodiments are also directed to an assembly of a hand grip as described above and a bar, wherein the bar includes one or more holes and/or recesses for receiving the protrusions. Furthermore, some embodiments relate to a baby stroller or a baby seat including such an assembly.

Figure 32:
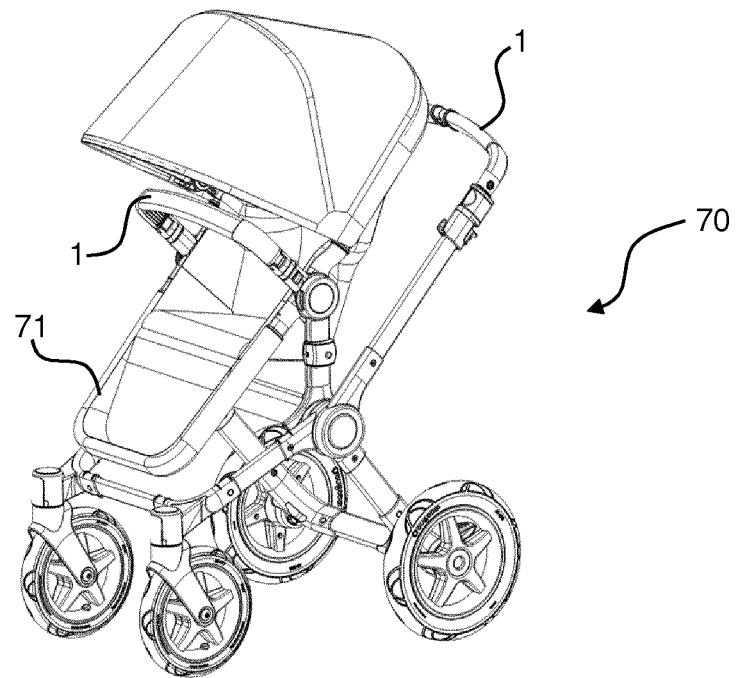
FIG. 32 is a perspective view of a baby stroller according to an embodiment.

FIG. 32 is a perspective view of a baby stroller 70 according to an embodiment. In this example the baby stroller 70 includes a baby seat 71. Both the baby stroller 70 and the baby seat 71 may have one or more hand grips as described above.

It should be noted that the above-mentioned embodiments illustrate rather than limit the presently disclosed subject matter, and that those of ordinary skill in the art will be able to design many alternative embodiments. Instead of one or more holes the handle bar may include a slot or a groove where the one or more protrusions can get hooked in. Furthermore the hand grip can be used for other applications, such as weight lifting bars.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A hand grip for wrapping around a bar having at least one hole or recess, the hand grip including:
   a first elongated coupling member having at least one first protrusion of a first kind, the at least one first protrusion of the first kind has a thickening located near or at a tip;
   a second elongated coupling member having at least one second protrusion of a second kind,
   a cover for providing a contact surface, the cover being arranged between the first elongated coupling member and the second elongated coupling member, and
   a separate fixing member having at least one fixing protrusion,
   wherein the at least one first protrusion of the first kind, the at least one second protrusion of the second kind and the at least one fixing protrusion are arranged to be inserted in the at least one hole or recess in the bar after coupling the first and second elongated coupling members onto the bar, such that the at least one fixing protrusion fills up a space between the at least one first protrusion of the first kind and the at least one second protrusion of the second kind.

2. The hand grip according to claim 1, wherein the at least one first protrusion of the first kind is an integral part of the first elongated coupling member, and the at least second protrusion of the second kind is an integral part of the second elongated coupling member.

3. The hand grip according to claim 1, wherein the first and second elongated coupling members are flexible at least in one dimension.

4. The hand grip according to claim 1, wherein the first and second elongated coupling members are configured so as to form an opening in a central part so as to provide a hole for a button arranged on the bar.

5. The hand grip according to claim 1, wherein the cover includes at least one of a foam layer and a protection layer.

6. The hand grip according to claim 5, wherein the protection layer includes leather, artificial leather or fabric.

7. An assembly including a bar having at least one hole or recess and a hand grip coupled to the bar, the hand grip including:

a first elongated coupling member having at least one first protrusion of a first kind, the at least one first protrusion of the first kind has a thickening located near or at a tip;

a second elongated coupling member having at least one second protrusion of a second kind;

a cover for providing a contact surface, the cover being arranged between the first elongated coupling member and the second elongated coupling member, and a separate fixing member having at least one fixing protrusion, wherein the at least one first protrusion of the first kind, the at least one second protrusion of the second kind and the at least one fixing protrusion are arranged in the at least one hole or recess of the bar, the at least one fixing protrusion of the separate fixing member being arranged to fill a space between the at least one first protrusion of the first kind and the at least one second protrusion of the second kind.

8. A baby stroller or baby seat including the assembly according to claim 7.

* * * * *